3,118,304
BRAKE SYSTEM
Royal J. Fuhs, 921 Thornberry Ave., Louisville, Ky.
Filed May 22, 1962, Ser. No. 196,800
2 Claims. (Cl. 73—308)

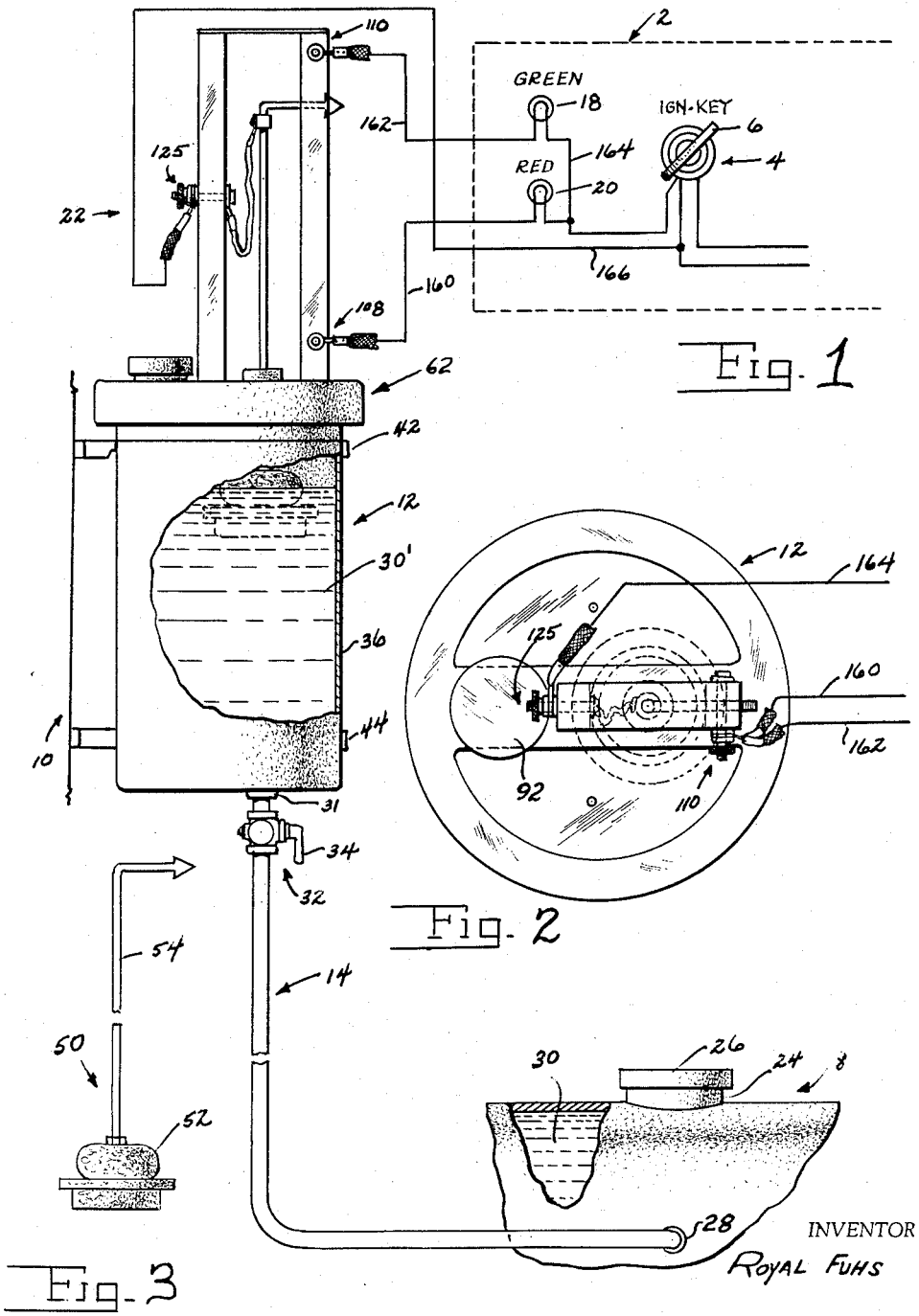

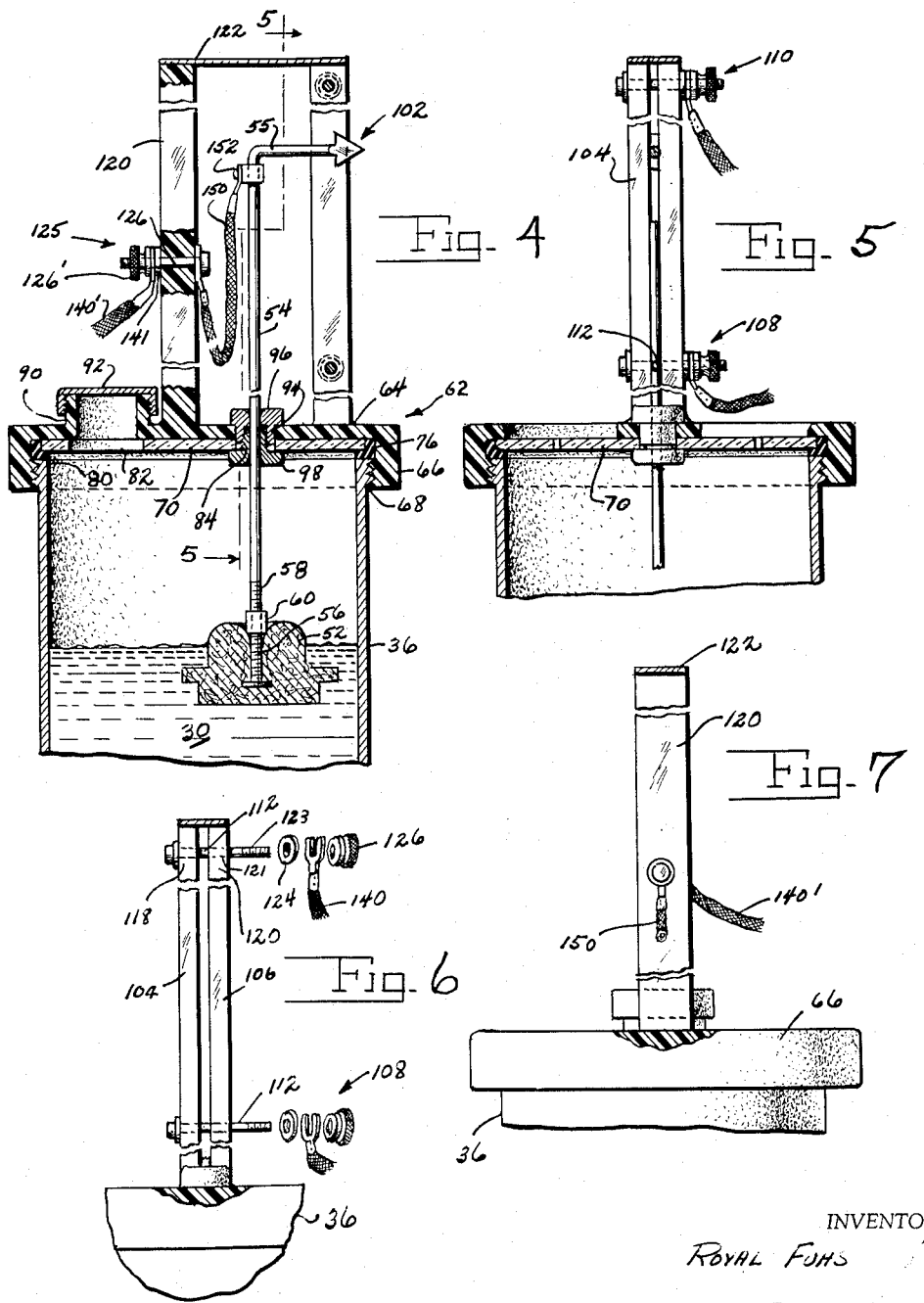

This invention relates generally to vehicles, and is particularly concerned with wheeled vehicles having hydraulic brake systems.

Of the various types of vehicles having hydraulic brake systems, conventional automobiles are the most common type, and thus for purposes of simplicity, the instant invention is discussed herein as applied to automobiles. It is to be understood, however, that the invention is applicable to any vehicle having a hydraulic brake system.

In the conventional type of hydraulic brake system used on automobiles, trucks, and the like, a hydraulic operating cylinder is disposed and supported in each wheel unit, and a master cylinder is provided remote from the wheels for purposes of storing and delivering hydraulic fluid under pressure to the individual operating cylinders disposed in the wheel units. Pressure is applied to fluid in the master cylinder upon operation of the normal brake pedal, and this pressure is transmitted to the individual operating cylinders by fluid passing through fluid pipes or conduits connecting the master cylinder with the individual operating cylinders.

The fluid path defined by the master cylinder, the connecting conduits, and the individual operating cylinders is closed to the outside environment so that pressures applied in the master cylinder are directly transmitted to the individual operating cylinders. However, with continued operation, because of some evaporation, or of some leakage, the hydraulic fluid in the braking system may decrease in volume. Thus, the normal master cylinder is provided with an inlet, normally closed by a removeable plug or closure, but through which additional fluid can be placed in the master cylinder, and thereby in the overall system.

Operation of a hydraulic braking system such as described above necessarily requires that the volume of hydraulic fluid, or as it is sometimes called "brake fluid," be maintained above a predetermined level. If there is an insufficient volume of brake fluid in the system, then when pressure is applied to the fluid in the master cylinder, the same is not properly distributed to the individual operating cylinders because the master cylinder becomes empty, or substantially empty as pressure is applied and fluid passes therefrom into the fluid conduits and individual operating cylinders. Thus, in a conventional automobile, it is a wise practice to check the level of brake fluid periodically with servicing of the automobile. However, most drivers do not take the time to check the brake fluid, and as a result the brakes on the vehicle become less and less effective until the operator finally senses that the efficiency of the braking system has decreased to such a value that he is unable to safely judge his effective braking distance.

The present invention has as its principle object the provision of means for visually indicating whether or not the supply of brake fluid in a given hydraulic braking system is adequate, which means requires no substantial modification whatsoever to the conventional master cylinder, and which means incorporates components which can be easily and readily positioned in available space and connected with available power sources. More specifically, a primary object of the present invention is to provide in combination with a vehicle having a hydraulic braking system with a master hydraulic cylinder therein, a dashboard, an ignition switching means, and a fire wall, an auxiliary level sensing and indicating system comprising auxiliary reservoir means adapted to be mounted on the vehicle fire wall at a level vertically above the master cylinder, fluid conduit means connecting the auxiliary reservoir means with the master cylinder for passing fluid thereto, visual indicator means mounted on the vehicle dashboard, sensing means carried by the auxiliary reservoir means for causing activation of the visual indicator means when the level of fluid in the auxiliary reservoir reaches a predetermined level, and electrical circuit means connecting the sensing means with the vehicle ignition switching means for selected energization of the sensing means in response to operation of the ignition switching means. In other words, the invention has as one of its primary objects, the provision of an auxiliary arrangement for use with a conventional hydraulic braking system, which auxiliary arrangement works in conjunction with the normal master cylinder and normal vehicle ignition system to indicate brake fluid level conditions, and which arrangement incorporates components that can be suitably mounted in available space in or on the vehicle both easily and inexpensively.

Additional, and even further, yet more specific objects of the present invention include: (a) the provision of an improved form of sensing means which can be inexpensively manufactured for use in an auxiliary arrangement such as described above; (b) the provision of such a sensing means which incorporates a float activated member or device and a guide therefor carrying electrical contacts engageable by said member or device so as to act as simple electrical switches selectively controlling visual indications presented; (c) the provision of an auxiliary arrangement conforming with the preceding objects which is readily adapted for use on large automobiles where there is an abundance of available space for mounting the components, as well as on the smaller type automobiles where available space for mounting additional components is at a minium; (d) the provision of such an arrangement which incorporates components that can be inexpensively manufactured to provide trouble-free operation; (e) the provision of such an auxiliary arrangement which incorporates means, components, and devices that can be easily installed on a vehicle by the ordinary mechanic in a short time; (f) the provision of such an auxiliary arrangement which increases the brake fluid capacity of the conventional braking system in addition to providing the desired visual indication or indications referred to above; (g) the provision of such an arrangement wherein an auxiliary reservoir is used in cooperation with the conventional master cylinder, and wherein the brake fluid level is sensed in the auxiliary reservoir, and not in the master cylinder; and, (h) the provision of such an arrangement which is trouble-free and reliable with continued operation and which can be readily supplied as an accessory with any vehicle having a hydraulic brake system thereon.

The invention lies in the combination, arrangement, design and construction of the various components incorporated in the auxiliary level sensing and indicating system provided hereby, and will be better understood from the following detailed description thereof. Such description refers to the annexed drawings presenting preferred and illustrative embodiments of the invention. In the drawings:

FIGURE 1 is a side view, partially broken away, and presenting the components of the auxiliary system provided hereby in cooperative association with the conventional vehicle units with which the system is most intimately associated;

FIGURE 2 is a top plan view of the auxiliary reservoir means and sensing means carried thereby, shown in FIGURE 1;

FIGURE 3 is a fragmental detailed side view of the preferred form of float means utilized in the auxiliary reservoir means in accordance with the invention;

FIGURE 4 is a fragmental side view, partially in section, of the auxiliary reservoir means and sensing means shown in FIGURES 1 and 2;

FIGURE 5 is a fragmental front view, partially in section, of the auxiliary reservoir means and sensing means shown in FIGURE 4;

FIGURE 6 is a fragmental exploded view showing the preferred details of construction of the guide means and associated contact means incorporated in the preferred embodiment hereof; and, FIGURE 7 is a fragmental rear view, partially in section, of the arrangement shown in FIGURE 5.

As suggested above, FIGURE 1 presents the auxiliary system hereof in exemplary cooperative association with certain conventional automobile-units or devices. Specifically, in FIGURE 1, a dashboard generally designated by the numeral 2 is schematically represented in dotted lines. The dashboard carries the conventional ignition switch or ignition switching means 4 in which a key 6 can be inserted for selective control.

Also in FIGURE 1, a fragment of a master cylinder, generally designated by the numeral 8 is presented together with a fragment of a conventional fire wall generally designated by the numeral 10. The fire wall, master cylinder, ignition switch, and dashboard, are conventional vehicle components, and it is assumed for purposes of this specification that such components are disposed in the standard positions with which the general public is familiar, namely, the dashboard 2 is assumed to be disposed immediately in front of the operator's seat, the fire wall 10 is assumed to be disposed between a front mounted motor and the vehicle interior, and the master cylinder 8 is assumed to be disposed under the floor board carrying the operator's seat.

Now, in its basic aspects, the auxiliary hydraulic fluid supply and fluid level indicating system of the invention comprises an auxiliary reservoir means generally designated by the numeral 12 and mounted on the fire wall 10 at a level vertically above the master hydraulic cylinder 8. A fluid conduit 14 connects the auxiliary reservoir means 12 with the master hydraulic cylinder 8 so that fluid passes from the auxiliary reservoir means to the master cylinder.

Visual indicator means generally designated by the numeral 16, and preferably comprising a pair of lamps 18 and 20 of different colors, such as for example, red and green as indicated in FIGURE 1, are provided.

Cooperatively associated with, and supported by, the auxiliary fluid reservoir means 12 is a sensing means generally designated by the numeral 22. The sensing means forms part of an electrical circuit including the visual indicator means 16 and the ignition switching means 4, as will be explained more fully hereinbelow.

The master cylinder 8 is coupled by suitable fluid conduits (not shown) in a standard manner with individual operating cylinders disposed at the wheel units (not shown) of the vehicle as explained at the outset of the instant specification. The master cylinder, as common, incorporates an inlet flange or coupling 24 having a removeable closure 26 fixed thereon, as by cooperating through screw threads on the closure and coupling. In accordance with the invention, the master cylinder 8 is tapped on one wall thereof, and preferably near the top, to provide an inlet aperture or bore which is threaded to receive a conduit coupling 28. The tapping and threading of the master cylinder 8 to receive the coupling 28 is performed in any suitable conventional manner, and can be readily carried out. As will be appreciated from the following paragraphs, the tapping of the master cylinder is the only modification made thereto in accordance with the invention.

The coupling 28 is carried at one end of the conduit 14, and the other end thereof communicates through a suitable coupling 31 of any conventional form with the base of the auxiliary reservoir means 12. As shown, such auxiliary reservoir means merely comprises a container having the coupling 30 fixed in the base thereof to receive the upper end of the conduit 14. The conduit 14 carries therein a valve 32 having a positive shutoff handle 34. Operation of the shutoff handle establishes communication between the auxiliary reservoir means 12 and the master cylinder 8, or eliminates such communication in the event it is desired to work on the master cylinder, and/or the individual operating cylinders and drain the fluid therefrom.

The auxiliary reservoir means 12 can comprise any suitable container, and as shown comprises a cylindrical can-type container 36 having the coupling 31 mounted in the base thereof. The container 36 is shown in FIGURE 1 as supported by straps 42 and 44 which mount the container on the fire wall 10. The straps 42 and 44 are exemplary, and any suitable support mounting can be used for the container 36 without departing from the scope and spirit of the invention. It is important to note, however, that the container 36 is mounted in the vehicle at a vertical level above the vertical level at which the master cylinder 8 is mounted. This relative disposition of the container 36 and the master cylinder 8 is important because fluid is drained, in accordance with the invention, from the container 36 to the master cylinder 8 under the action of gravity.

Bearing in mind only the aforesaid connections between the auxiliary reservoir means 12 and the master cylinder 8, it should be apparent that the level of the liquid 30 in the master cylinder 8 will always be at a maximum so long as there is liquid 30' in the container 36 or auxiliary reservoir means 12. The numerals 30 and 30' designate the same liquid, but a prime numeral has been used for purposes of simplifying the description in reference to the liquid contained in the respective reservoirs, namely master cylinder 8, and container 36.

The level of the liquid 30' is, as suggested above, used for the sensing operation in accordance with the invention. Thus, the sensing means 22 includes a float means generally designated by the numeral 50 and best shown in FIGURE 3, as well as a control sensing means cooperating therewith. The float means 50, as shown in FIGURE 1 through FIGURE 4, comprises a float body 52 formed of a material floatable on the liquid 30', and an actuating rod member 54 projecting upwardly therefrom. The connection between the float member or body 52 and the actuating rod member 54 can be achieved in any desired manner. As shown, the float body 52 carries a threaded lug 56 projecting upwardly thereof, and the actuating rod member 54 has a threaded base portion 58. A coupling 60 connects the threaded base portion 58 with the upper end of the lug 56 and thus secures the actuating rod member 54 to the float body 52 whereby the actuating rod member 54 is reciprocally moveable in response to reciprocal movement of the float body 52 with variations in the level of the liquid 30' in container 36.

A support 62 in the form of a closure cap having a crown portion 64 and a depending skirt portion 66 is carried at the top of the container 36. For this purpose, the container 36 has a threaded mouth 68, the threads of which cooperate with the interior threads of the skirt portion 66. A sealing gasket 70 is carried adjacent the underside of the crown portion 64 of the closure 62, and this sealing gasket serves to press a sealing washer 76 into sealing engagement between the lip 80 of the mouth portion 68 of container 36 and the sealing gasket 70 carried by the closure 62 for the container.

As shown, the gasket 70 is provided with an offset opening 82 therein as well as with a central opening 84 therein. The offset opening 82 is aligned with an inlet flange or spout 90 carried by the closure 62. A removeable closure 92 having a skirt portion with interior threads cooperates with the external threads on the spout 90 whereby to yield a selectively closeable opening for the container 36.

The opening 84, in contrast with the opening 82, is aligned with an aperture 94 in the closure 62. Received within the aperture 94 and opening 84 respectively are a pair of cooperating bearing couplings 96 and 98 which threadably engage each other and provide a bearing bore 98 in the closure 62.

While the particular construction of the closure 62 shown in the drawings has been described in detail hereinabove, and while certain means for providing a bearing bore have been shown and described in detail, it is to be understood that any suitable arrangement can be used provided some support at the top of the container 36 is existent, provided there is some inlet to the container 36 which is preferably selectively closeable, and provided there is some means for reciprocally mounting the actuating rod member 54. The arrangement shown has been found to be satisfactory, but can be varied without departing from the scope and spirit of the invention.

Now, having an understanding of the manner in which the actuating rod member 54 should be mounted, and the manner in which the same is reciprocally moveable with variations in the level of the liquid 30′, attention can be directed more specifically to the control sensing means referred to above. As shown in FIGURES 1, 4, 5, and 6, a guide means generally designated by the numeral 102 and comprising a pair of uprights 104 and 106 is supported on top of the closure 62. The uprights 104 and 106 are disposed in parallel spaced apart relation to each other and receive therebetween a lateral extension 55 of the actuating rod member 54. The uprights 104 and 106 are preferably formed of an electrically non-conductive material, although as explained more fully below, if desired, suitable insulation can be provided, and the uprights can be formed of a metallic material. In any event, the uprights 104 and 106 carry at least one, and preferably two, electrical contact means generally designated by the numerals 108 and 110. Each of the electrical contact means comprises an electrically conductive shaft 112 which extends between the uprights 104 and 106 in the reciprocal path of movement of the lateral extension 55 of the actuating rod member 54. Suitable apertures are provided in the uprights to receive the electrically conductive shafts 112, as shown for the upper shaft 112 in FIGURE 6, such apertures being presented in phantom and designated by the numerals 118 and 121 respectively. The electrically conductive shafts 112 preferably have a threaded end portion 123 adapted to receive a coupling washer 124 and a knurled nut 126. In essence, the shafts 112 serve with the associated portions of the uprights to provide a binding post for electrical leads or connectors.

Also carried by the closure member 62 is an additional or rear upright 120. The rear upright 120 is preferably coupled with the forward uprights 104 and 106 by means of a cross member 122. The uprights 104, 106 and 120, with the cross member 122 serve as a frame or frame means within which the actuating rod member 54 is reciprocally moveable. The rear upright, in addition to providing support for the forward uprights forming the guide means for the lateral extension 55 of the actuating member, also serves as a mount for an additional electrical contact generally designated by the numeral 125. The additional electrical contact 125 also includes an electrically conductive shaft 126 similar to the shaft 112 described hereinabove. Moreover, the shaft 126 has a threaded end portion, like the shaft 112, adapted to receive a conductive washer 124′ and knurled nut 126′.

The various connecting members or contact members, referred to hereinabove, as shown schematically, simplify connection of leads such as those designated by numeral 140 with the respective contact elements. The shafts 112 carried between the uprights 104 and 106 cooperate with the lateral extension 55 whereby such extension and the shafts serve effectively as electrical switches in the manner explained more fully below. The shaft 126, on the other hand, serves purely as a binding post for an incoming lead 140′ and a flexible coupling lead 150 which extends from the shaft 126 to an electrical coupling collar 152 carried adjacent the lateral extension 55 of the actuating rod member 54. In the embodiment shown, at least the lateral extension 55 of the actuating rod member 54 is electrically conductive.

With an understanding of the aforesaid structural features, it should be appreciated that as the level of the liquid 30′ in the container 36 varies, the float body 52 moves reciprocally within the container 36. As a result, the actuating rod member 54 also moves reciprocally with movement of the float body 52. Similarly, the lateral extension 55 reciprocates along and between the guide means 102 formed by the uprights 104 and 106. When the level of the liquid 30′ in the container 36 rises sufficiently, then the lateral extension 55 of the actuating rod member 54 moves into engagement with the upper shaft 112 extending between the uprights 104 and 106. Conversely, when the level of the liquid 30′ in the container 36 has descended a predetermined amount, and the float body 52 has correspondingly descended therewith, then the lateral extension 55 on the actuating rod member 54 has moved down to a position in engagement with the lower shaft 112. The aforesaid movement of the lateral extension, and engagement thereof with the shaft 112, is used for purposes of controlling the visual indicating means 16 discussed in connection with FIGURE 1. Specifically, if reference is again made to that figure, it will be noted that a lead 160 extends from one side of the lamp 20 to the lower contact means 108. Similarly, a lead 162 extends from one side of the lamp 18 to the upper contacting means 110. The opposite side of both lamps is connected by a common lead 164 to one input line or terminal of the ignition switching means 4. The opposite input terminal of the ignition switching means 4 is coupled via the lead 166 with the binding post 125. It will be understood that the input terminals to the conventional ignition switch represent opposite terminal connections from a battery, and that accordingly the connections described serve to electrically connect the binding post 125 with one terminal of a battery, and the lead 164, common to both lamps 18 and 20, with the other terminal of the battery. Electrical connection between the binding post 125 and the lateral extension 55 of the actuating rod member 54 is established through the electrical lead or cable 150.

By virtue of the aforesaid connections, when the ignition switching means is turned to the position where electrical energy is supplied to the entire electrical system of the vehicle, the system of the invention is placed in operation. The control sensing means which includes the contact means 108 and 110 as well as the guide means, and the lateral extension on the actuating rod member 54 is then in condition to effectively indicate the brake fluid level.

Assume that initially the level of the liquid 30′ in the container 36 is a maximum. In this instance, the lateral extension 55 engages the upper shaft 112, and a complete electrical circuit is established through the green lamp 18. Such circuit includes the path from lead 166 through binding post 125, connecting cable 150, lateral extension 55, connecting means 110, lead 162, lamp 18, and lead 164.

In contrast, when the level of the liquid 30′ has descended to a point where the lateral extension 55 engages the lower shaft 112, or contact means 108, then a circuit is established through the other lamp, namely lamp 20. In this instance, the circuit runs from lead 166 through binding post 125, connecting cable or lead 150, lateral extension 55, contact means 108, lead 160, lamp 20, and lead 164.

If the lamps 18 and 20 are selected to be of different colors, such as red and green, the normal stop and go signals, then an effective visual indication of the brake fluid level is given to the operator of the vehicle on which the system of the invention is installed. Specifically, when the level of the liquid 30' in the container 36 is at a maximum, the green light is on, and the operator knows that the brake fluid level is adequate. Alternatively, when the level of the liquid 30' has descended to a value where it is dangerous, then the red lamp 20 is energized, and the operator is given a positive indication that he should replace or add brake fluid immediately. When the brake fluid is at an intermediate level in the container 36, no visual indication is given to the operator, and this means that he should check the brake fluid at his earliest convenience.

While the structure of the invention has been shown in exemplary form in the drawings, it will be understood that the components thereof can be suitably dimensioned for use in any automobile. The size of the components can be varied to adapt them to fit specific spaces, and if desired, a single small unit can be made for use on all different types of vehicles. It will be appreciated that installation of the auxiliary system provided hereby can be accomplished with speed by virtue of the simplicity of the construction, and the minor modification to existing vehicle devices required.

Although the valve 32 in the line 14 has been described as a shutoff valve hereinabove, if desired, a conventional check valve can be used. Specifically, a one-way valve permitting passage of fluid only from reservoir 30' to master cylinder 8 can be incorporated. Such check valve, as conventional, would prevent reverse flow, and thus the normal brake fluid volume in an existing system would not in any way be disturbed. In this instance, preferably the check valve would incorporate a manually operable handle which would serve to positively shut off communication between the container 36 and the master cylinder 8 so that repairs could be made without draining the auxiliary reservoir. It should be appreciated that an additional advantage of using a check valve such as suggested in this paragraph would be to achieve a completely full basic brake system, regardless of the level of brake fluid in the auxiliary reservoir. Selective one-way transfer of fluid to the master cylinder would provide for maintaining such cylinder full, and the effect of any air space above the fluid in the auxiliary reservoir would be eliminated.

Although the uprights 104 and 106 are preferably formed of a non-conductive material, a conductive material can be used. In such instance, suitable insulating collars would be incorporated to electrically insulate the shafts 112 and the washers and nuts associated therewith from the upright. Insulation in such manner is conventional, and need not be discussed further. It is to be understood that while binding posts such as 108, 110 and 125 have been shown, any suitable connection means can be incorporated, if desired.

The electrical properties of the float member can be varied. If the bearing coupling components 96 and 98 are formed from an insulating material, then the rod member 54 can be metal, and the float body 52 can be any electrical insulator. If the coupling components are metal, then the extension 55 can be conductive and the major portion of rod 54 non-conductive. These are but examples of the electrical properties of the float means which can be incorporated, and are not set forth to the exclusion of other variations which will achieve the desired result.

After reading the foregoing detailed description of the preferred and illustrative embodiments of the invention, it should be readily appreciated that the objects set forth at the outset of this specification have been successfully accomplished. Accordingly,

What is claimed is:

1. Means for sensing and visually indicating the level of hydraulic fluid in an open top reservoir comprising a closure support means adapted to close the top of said reservoir, said closure support means having a first opening therein, a float member adapted to float in fluid in said reservoir, a float arm carried by said float member and extending vertically through said first opening, seal means receiveing said arm for reciprocal movement therein and sealing said first opening about said float arm, said seal means comprising a pair of cooperating bearing couplings threadably engaging one another, said float arm having a lateral extension thereon, a guide frame for said float arm, said lateral extension being vertically movable with respect to said guide frame, said guide frame carrying electrical contact means thereon engageable by said lateral extension of said float arm, said closure support means having a second opening therein providing a fluid inlet, a removable closure for said second opening, said guide frame comprising a pair of uprights mounted in parallel spaced apart position on said closure support means and a third upright mounted on said closure support means in spaced relation to said pair of uprights, means connecting said pair of uprights and said third upright at the upper ends thereof, said lateral extension of said float arm passing between said pair of uprights, said float arm being reciprocal between said pair of uprights and said third uprights, said electrical contact means comprising electrically conductive shafts passing between said pair of uprights at vertically spaced apart positions, said pair of uprights and said third upright being formed of electrically non-conductive material, at least the part of said lateral extension engageable with said contact means being electrically conductive, connector means carried on said third upright, flexible electrical cable means extending from said electrically conductive part of said lateral extension to said connector means for coupling said connector means and said electrically conductive part of said lateral extension in an electrical circuit with said electrically conductive shafts of said contact means whereby said shafts and said part of said lateral extension comprise effective switch contacts, and at least two electrically responsive visual indicating means having two electrical terminals, one terminal of each of said visual indicating means being electrically connected to a different one of said electrically conductive shafts and the other terminal of each of said visual indicating means being electrically connected to said connector means, said visual indicating means comprises a pair of lamps of different colors.

2. Means for sensing the level of hydraulic fluid in an open top reservoir comprising a closure support means adapted to close the top of said reservoir, said closure support means having a first opening therein, a float member adapted to float in fluid in said reservoir, a float arm carried by said float member and extending vertically through said first opening, seal means comprising a pair of cooperating bearing couplings threadably engaging one another and receiving said arm for reciprocal movement therein and sealing said first opening about said float arm, said float arm having a lateral extension thereon, a guide frame for said float arm, said lateral extension being vertically movable with respect to said guide frame, said guide frame carrying electrical contact means thereon engageable by said lateral extension of said float arm, said closure support means having a second opening therein providing a fluid inlet, a removeable closure for said second opening, said guide frame comprising a pair of uprights mounted in parallel spaced apart position on said closure support means and a third upright mounted on said closure support means in spaced relation to said pair of uprights, means connecting said pair of uprights, means connecting said pair of uprights and said third upright at the upper ends thereof, said lateral extension of said float arm passing between said pair of uprights, said float arm being reciprocal between said pair of uprights and said third upright, said electrical contact means comprising electrically conductive shafts passing between said pair of uprights at vertically spaced apart positions, all said uprights being formed of electrically non-conductive material, at least the part of said lateral extension engageable with said contact means being electrically conductive, first connector means carried on said third upright, flexible electrical cable means extending from said part to said first connector means for coupling said part in an electrical circuit and second connector means carried on said shafts for connecting said electrically conductive shafts in circuit with said contact means whereby said shafts and said part of said lateral extension comprise effective switch contacts.

References Cited in the file of this patent

UNITED STATES PATENTS

| | | |
|---|---|---|
| 1,216,678 | Ford | Feb. 20, 1917 |
| 1,373,474 | Wight | Apr. 5, 1921 |
| 2,681,959 | Lanyon | June 22, 1954 |
| 2,887,880 | Hughes et al. | May 26, 1959 |
| 2,907,844 | Lindsey | Oct. 6, 1959 |

FOREIGN PATENTS

| | | |
|---|---|---|
| 11,466 | Great Britain of 1889 | Aug. 31, 1889 |
| 641,514 | Great Britain | Aug. 16, 1950 |